Sept. 28, 1971  A. P. BENTLEY  3,608,396
SECTIONAL CRANKSHAFT
Filed Feb. 2, 1970
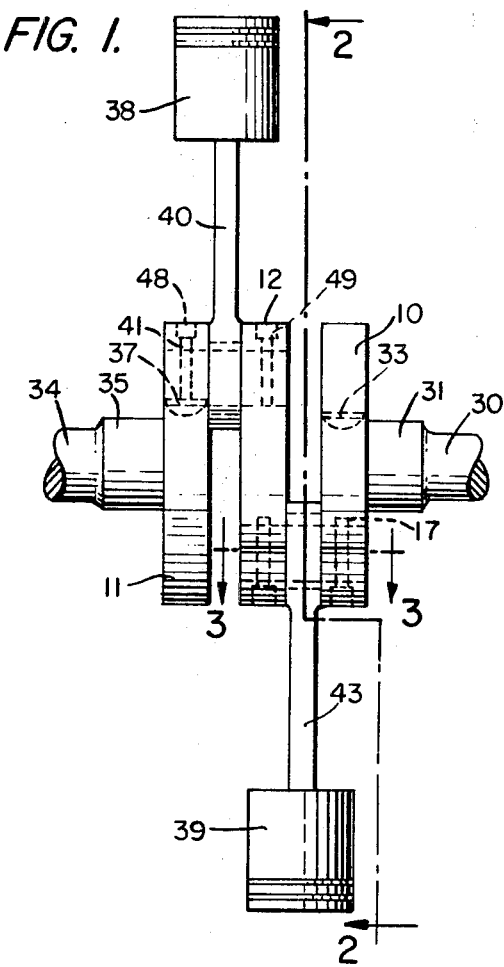
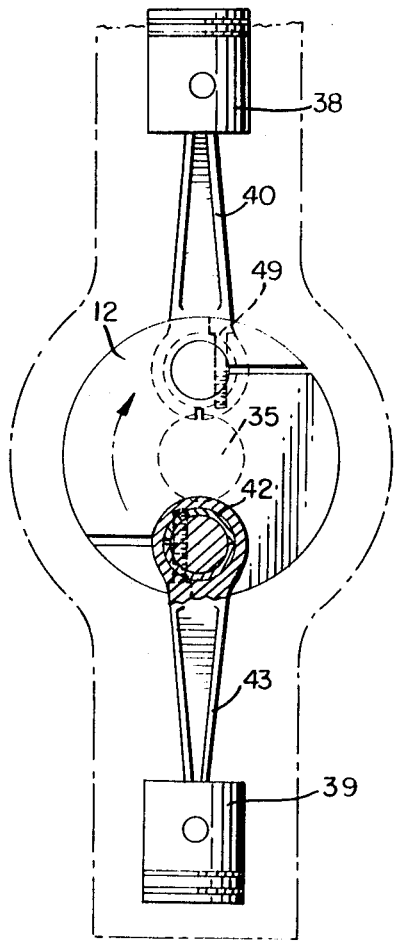
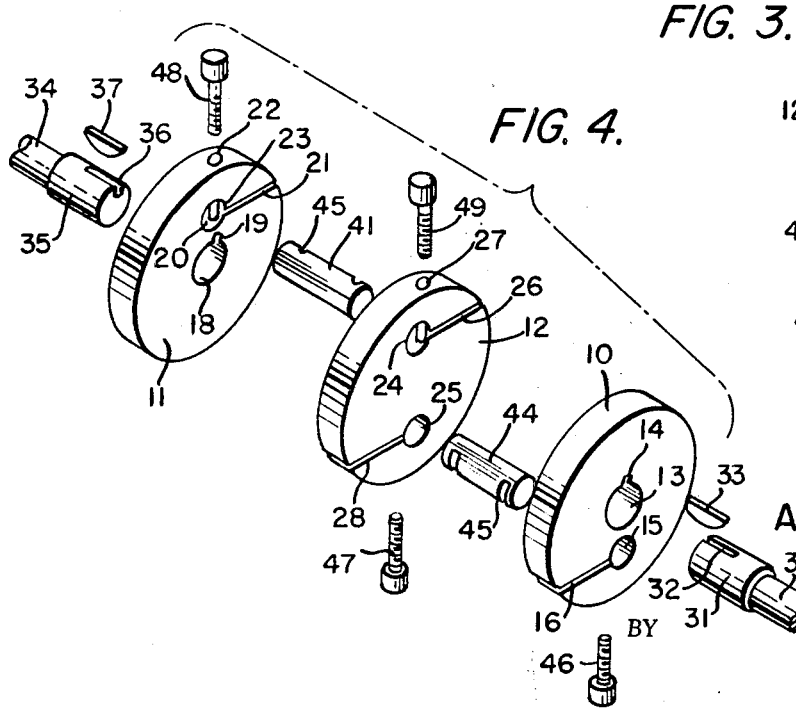
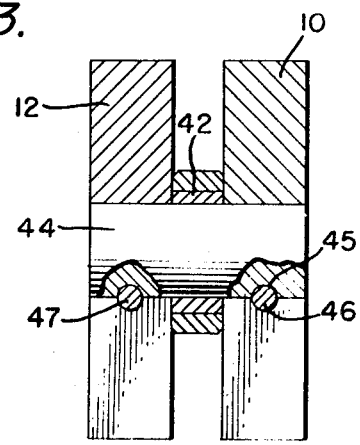
INVENTOR
ARTHUR P. BENTLEY
BY Schellin & Hoffman
ATTORNEYS

United States Patent Office 3,608,396
Patented Sept. 28, 1971

3,608,396
SECTIONAL CRANKSHAFT
Arthur P. Bentley, Box 139, Boerne, Tex. 78006
Filed Feb. 2, 1970, Ser. No. 7,680
Int. Cl. F16c 3/10
U.S. Cl. 74—597          4 Claims

ABSTRACT OF THE DISCLOSURE

This specification discloses a sectional crankshaft, which, in its simplest form, comprises two main shafts in axial alignment and with ends in spaced relation, a cap plate for each of said ends in the form of a heavy disc that is keyed to a shaft end, an intermediate disc of the same size and shape as said cap plates and a pair of crank pins disposed 180° apart with one pin connecting one cap plate to the intermediate disc and with its axis offset with respect to that of the shafts and the other pin connecting the other cap plate to the intermediate disc with its axis similarly offset.

---

The present invention relates to crankshafts such as those ordinarily connected to the pistons of internal combustion engines and is concerned primarily with such a crankshaft that is of sectional construction.

BACKGROUND OF THE INVENTION

At the present time it is the conventional, if not universal practice, to produce the crankshaft of an internal combustion engine by first forging a piece of metal, usually steel, into a shape approximating that of the ultimate product, and then finishing the various surfaces on a crankshaft lathe.

Known crankshafts are of such a weight and mass that a flywheel is required in conjunction therewith. Balance is a highly important factor in a crankshaft and great care must be exercised in the machining thereof to achieve this balance. Accuracy in connecting the flywheel to the crankshaft is also important from the aspect of maintaining this balance.

While certain types of sectional crankshafts have been proposed it may be stated as a general proposition, the proposition on which this invention is predicated, that known sectional crankshafts do not meet with public acceptance for many reasons. Among them are: the failure to include a flywheel as an element of the crankshaft itself, lack of proper balance, and complexity of construction with its attendant difficulties of assembly.

OBJECTS OF THE INVENTION

With the foregoing conditions in mind, the present invention has in view the following objects:

(1) To provide a sectional crankshaft that is the epitome of simplicity and the components of which may be readily made and easily assembled.

(2) To provide a sectional crankshaft in which a flywheel is built into elements of the crankshaft.

(3) To provide a sectional crankshaft in which accurate balance is achieved with great facility; and (4) To provide a sectional crankshaft which in its simplest form comprises a minimum number of parts and is capable of accommodating the connecting rods of two pistons. This unit may be supplemented by similar units, substantially identical, which provide for the accommodation of additional connecting rods in pairs. Thus a sectional crankshaft for four, six or eight pistons may be provided by utilizing a required number of the units which identify this invention.

Various other more detailed objects and advantages of the invention such as arise in connection with carrying out the above noted ideas in a practical embodiment will in part become apparent and in part be hereinafter stated as the description of the invention proceeds.

SUMMARY OF THE INVENTION

The above objects are attained by providing a crankshaft comprising a pair of main shafts having ends in spaced relation. A cap plate in the form of a massive disc is formed with a central bore that receives the end of one of said shafts which is keyed to that cap plate. The latter is also formed with a passage extending between its faces and the axis of which is offset with respect to the central bore. A similar cap plate is mounted on and keyed to the end of the other main shaft.

An intermediate disc of the same size and shape as the cap plates is formed with two passages in diametrically opposed relation and which are spaced from the center of the disc the same distance as are the passages in the cap plates. One of the passages in the disc aligns with the offset passage in one cap plate and the other disc passage aligns with the passage in the other cap plate. A crank pin has its ends anchored in each pair of aligned passages leaving a portion between each cap plate and disc to which an end of a connecting rod is attached by a bearing. Thus the two connecting rods are connected to the crank pins at an angular distance of 180°.

For a full and more complete understanding of the invention reference may be had to the following description and accompanying drawing wherein:

FIG. 1 is a view in side elevation of a sectional crankshaft embodying the principles of this invention and illustrating two pistons operatively connected thereto.

FIG. 2 is a view taken normal to the showing of FIG. 1 with one of the crank pins being shown in section. This view is taken about on the planes represented by the line 2—2 of FIG. 1.

FIG. 3 is a detailed section on an enlarged scale through the area of one crank pin, being taken about on the plane represented by the line 3—3 of FIG. 1; and FIG. 4 is a perspective depicting the several components of the subject crankshaft in exploded relation.

Referring now to the drawing wherein like reference characters denote corresponding parts, and first more particularly to FIGS. 1 and 4, a crankshaft unit of this invention is shown as including cap plates 10 and 11 and an intermediate disc 12. These elements are of an appropriate metal such as steel and are fairly heavy and massive so that they collectively constitute a flywheel.

Cap plate 10 has a central bore 13 into which opens a keyway 14. It also is formed with a passage 15 which extends between its faces. Passage 15 is axially offset with respect to bore 13 and extending therefrom to the periphery of cap plate 10 is a slot 16 for a purpose to be later described. Entering cap plate 10 from its peripheral surface in a direction substantially normal to slot 16 is a threaded passage 17 shown in dotted lines in FIG. 1. The outer end of passage 17 is countersunk.

Cap plate 11 is a substantial duplicate of cap plate 10. Thus it has a bore 18, keyway 19, offset passage 20, slot 21, and countersunk passage 22. It is notable that passages 17 and 22 are threaded and are located at the juncture of each slot and offset passage respectively. Also the threaded passages are interrupted by the offset passages and slots so that portions thereof are present in the walls defining the offset passages as indicated at 23 in FIG. 4.

Disc 12 has offset passages 24 and 25 spaced 180° apart and equidistantly offset with respect to the center of the disc. This spacing of the axes of these passages is exactly the same as the space between passage 15 and bore 13 of cap plate 10 and passage 20 and bore 18 of cap plate 11. Slot 26 extends from passage 24 to the periphery of disc 12 and a countersunk threaded passage 27 enters the disc 12 from its periphery in a direction normal to slot 26 which it crosses where the slot joins passage 24. Similarly a slot 28 extends from passage 25 to the periphery of disc 12 and a countersunk threaded passage 29 (dotted lines, FIG. 1) is formed in disc 12 in the same relation to slot 28 and passage 25 as described in connection with threaded passage 27 and slot 26.

A main shaft 30 has an enlarged end portion 31 which is accurately dimensioned to be snugly received in bore 13. End portion 31 is formed with a keyway 32 (FIG. 4) which assumes a position opposite to keyway 14. A key 33 occupies both keyways 14 and 32 and establishes a driving relation between cap plate 10 and shaft 30.

Another main shaft 34 which is in axial alignment with main shaft 30 has an enlarged end portion 35 received in bore 18 and is formed with a keyway 36 which receives a key 37 that also seats in keyway 19. Thus shaft 34 is keyed to cap plate 11.

Disc 12 is arranged so that passages 15 and 25 in cap plate 10 and disc 12 align and passages 20 and 24 in cap plate 11 and disc 12 also align.

Referring now to FIGS. 1 and 2, pistons 38 and 39 are arranged in diametrically opposed relation. It will be understood that each of these pistons is received in a cylinder of an internal combustion engine. A connecting rod 40 has one end connected to piston 38 by a wrist pin (not illustrated) in a well known manner and its other end is mounted on a crank pin 41 with a bearing 42 (FIG. 3) providing a freely journalled relation between the connecting rod and crank pin.

Similarly a connecting rod 43 has one end connected to piston 39 and its other end journalled on a crank pin 44 with a bearing 42 between the two.

Each of crank pins 41 and 44 is formed with a pair of kerfs or slots 45 which open onto its outer contour and which are located near the opposite ends thereof.

With one end of connecting rod 43 and a bearing 42 assembled on crank pin 44 and passages 15 and 25 in alignment cap plate 10 and disc 12 are moved towards one another to cause the end portions of crank pin 44 to enter passages 15 and 25. As this operation occurs kerfs 45 are disposed opposite to slots 16 and 28.

A headed screw 46 is now screwed into threaded passage 17 and another headed screw 47 into passage 29. These screws are tightened and threaded "home" so that slots 16 and 28 are contracted and the walls of passages 15 and 25 clamped about the end portions of crank pin 44. As this action takes place portions of the screws enter kerfs 45 to securely hold the crank pin 44 against axial movement relative to the disc and cap plate.

After the end of connecting rod 40 and bearing 42 are assembled on crank pin 41 the latter has its end portions anchored to cap plate 11 and disc 12 in exactly the same manner described above in connection with crank pin 44, headed screws 48 and 49 being used in the same manner as screws 46 and 47.

It is evident that main shafts 30 and 34, with cap plates 10 and 11 keyed thereto, and disc 12 assembled therebetween by crank pins 41 and 44 constitute a highly simplified crankshaft with a flywheel incorporated therein and in which accurate balance may be readily achieved.

While a preferred specific embodiment of the invention is hereinbefore set forth, it is to be clearly understood that the invention is not to be limited to the exact constructions, mechanisms and devices.

What is claimed is:

1. In a sectional crankshaft intended for use in an internal combustion engine presenting a pair of pistons in diametrically opposed relation and a connecting rod extending from each piston towards the crank shaft,
    (a) a pair of main shaft end portions in axial alignment and in spaced relation,
    (b) a cap plate in the form of a massive disc keyed at the center thereof to each of said end portions, each of said cap plates having a passage offset with respect to the center of that cap plate with the distance of offset being the same in both cap plates, and a slot extending from each offset passage to the periphery of the cap plate in which it is formed,
    (c) a disc between said cap plates in spaced relation relative thereto, said disc having a pair of passages therein offset with respect to the center thereof and spaced 180° apart, one of the passages in the disc aligning with the offset passage in one cap plate while the other of the disc passages aligns with the offset passage in the other cap plate,
    (d) a pair of crank pins, one of which is received in one pair of aligned offset passages and the other in the other pair of aligned offset passages, each of said crank pins having an end of a connecting rod journalled thereon, and
    (e) means for clamping said cap plates and disc about end portions of said crank pins and preventing axial movement of the crank pins relative to the cap plates and disc.

2. The sectional crankshaft of claim 1 in which there is a bearing on each crank pin providing a journal for the respective connecting rod end.

3. The sectional crankshaft of claim 1 in which the cap plates and disc are formed with threaded passages normal to the slots therein and the clamping means take the form of screws in said threaded passages.

4. The sectional crankshaft of claim 3 in which each crank pin has a pair of kerfs, one adjacent to each end, with each kerf receiving a portion of one of said screws.

References Cited

UNITED STATES PATENTS 1,186,749   6/1916   Cobb _____ 74—597
1,715,489   6/1929   Baer _____ 74—597

WILLIAM F. O'DEA, Primary Examiner
F. D. SHOEMAKER, Assistant Examiner

U.S. Cl. X.R.

74—598